US005996223A

United States Patent [19]
Ogawa et al.

[11] Patent Number: 5,996,223

[45] Date of Patent: Dec. 7, 1999

[54] WIRING ASSEMBLY PRODUCING METHOD AND A TERMINAL CONNECTED WIRE INSERTING APPARATUS

[75] Inventors: Satoshi Ogawa; Kouichi Ueda; Teiji Sakuma; Kazumitsu Fukada, all of Yokkaichi, Japan

[73] Assignee: Sumitomo Wiring Systems, Ltd., Japan

[21] Appl. No.: 08/881,338

[22] Filed: Jun. 24, 1997

[30] Foreign Application Priority Data

Jun. 25, 1996 [JP] Japan .................................... 8-164844

[51] Int. Cl.[6] ............................ H01R 43/04; B23P 19/00

[52] U.S. Cl. ............................ 29/861; 29/748; 29/33 M; 29/753; 29/564.4; 29/754

[58] Field of Search ............................ 29/845, 759, 861, 29/564.4, 753, 748, 33 M

[56] References Cited

U.S. PATENT DOCUMENTS

| | | | |
|---|---|---|---|
| 4,074,424 | 2/1978 | Deshich et al. . | |
| 4,139,937 | 2/1979 | L'Homme | 29/754 |
| 4,171,566 | 10/1979 | Tominoi | 29/564.4 X |
| 4,581,796 | 4/1986 | Fukuda et al. . | |
| 4,967,470 | 11/1990 | Folk . | |
| 5,109,602 | 5/1992 | Fukuda et al. | 29/861 X |
| 5,127,159 | 7/1992 | Kudo et al. . | |
| 5,208,977 | 5/1993 | Ricard | 29/861 |
| 5,355,583 | 10/1994 | Osumi et al. | 29/866 X |
| 5,666,718 | 9/1997 | Onishi et al. | 29/754 X |

FOREIGN PATENT DOCUMENTS

| | | |
|---|---|---|
| 57-170409 | 10/1982 | Japan . |
| 58-25014 | 2/1983 | Japan . |
| 5-234659 | 9/1993 | Japan . |
| 6-223646 | 8/1994 | Japan . |
| 6-260260 | 9/1994 | Japan . |

*Primary Examiner*—Carl J. Arbes
*Attorney, Agent, or Firm*—Anthony J. Casella; Gerald E. Hespos

[57] ABSTRACT

A wire supply unit 30 is provided on which terminal connected wires TW can manually be loaded. The wire supply unit 30 includes retainers 20. Each retainer 20 positions the terminal connected wires TW such that the terminal connected wires TW can be transferred to the inserting unit 50. The terminal connected wires TW can be transferred directly to the inserting unit 50 so as to be inserted into connector housing C.

8 Claims, 11 Drawing Sheets

WIRING ASSEMBLY PRODUCING METHOD AND A TERMINAL CONNECTED WIRE INSERTING APPARATUS

BACKGROUND OF THE INVENTION

1. Field of the Invention

The present invention relates to a wire assembly producing method and a terminal connected wire inserting apparatus and, particularly to a wire assembly producing method and a terminal connected wire inserting apparatus for the automatic insertion of terminals connected with wires which will construct a wiring harness and a sub-assembly of the wiring harness (hereinafter, "wire bundle assembly") of an automotive vehicle, a copier or other applications.

2. Description of the Prior Art

Automatic production of a wire bundle assembly typically involves a terminal-connected wire producing process and a connecting process. The terminal connecting wire producing process includes a wire cutting step of measuring and cutting a wire, a peeling step of peeling an insulation coating at the opposite ends of the cut wire and a terminal mounting step of mounting terminals on the peeled opposite ends of the wire. The connecting process includes inserting the terminals of the terminal connected wires produced by the producing process into a connector housing.

For example, Japanese Unexamined Patent Publications Nos. (SHO)57-170409, (SHO)58-25014, (HEI)5-234659 and (HEI)6-260260 disclose an automatic production system including all of a wire cutting station for performing the wire cutting step, a peeling station for performing the peeling step, a terminal mounting station for performing the terminal mounting step and a connecting station for performing the inserting or connecting process.

On the other hand, Japanese Unexamined Patent Publication No. (HEI)6-223646 discloses a construction in which the producing process and the inserting or connecting process are separated. In this construction, the producing process is performed by an automatic production system to produce terminal connected wires, the produced terminal connected wires are placed on a stock carriage, and the inserting or connecting process is manually performed. Further, this production system has two separate lines: a line for mounting standardized terminals and a special mounting line (e.g. in the case that terminals of special sizes are mounted or the same terminal is mounted on a plurality of wires).

The aforementioned prior art production systems in which the producing process and the inserting or connecting process are performed in the same line have several problems. For example, the inserting or connecting process typically takes a longer time than the producing process. Thus the production performance of the wire bundle assembly is restricted by the inserting or connecting process. Further, the kinds of terminals to be mounted in the same line are limited. Therefore the insertion of a multitude of kinds of terminals into the connector housing cannot be met by simply replacing an apparatus used in the inserting or connecting process.

Prior art systems in which the producing process and the inserting connecting process are performed in separate lines also have problems. For example, it is difficult to transfer terminals to an inserting unit with the terminals of the terminal-connected wires already mounted. This makes it difficult to realize automation. Accordingly, as disclosed in Japanese Unexamined Patent Publication No. (HEI)6-223646, an undesirable compromise of manually mounting the terminals into the connector housing needs to be made.

The present invention was developed in view of the above problems, and an object thereof is to provide a wire assembly producing method and a terminal connected wire inserting apparatus which facilitate automation.

SUMMARY OF THE INVENTION

In order to accomplish the above object, the present invention is directed to a method for producing a wire assembly by inserting one or more terminals of one or more terminal-connected wires into one or more connector housings. The method comprises a first step of holding the terminal of a previously prepared terminal-connected wire, with the terminal partly exposed such that the terminal connected wire is transferable while rotation of the terminal is prevented. The method proceeds with a step of receiving the held terminal by gripping it with a gripper or clamp. The method may then conclude with a step of inserting the received terminal into the connector housing by the gripper or clamp. These steps may be carried out simultaneously on a plurality of terminal-connected wires with one or more housings.

According to the above inventive method, by preventing rotation of the terminal, the terminal can be uniformly positioned and can be transferred to the gripper or clamp. As a result, the terminal can directly be inserted into the connector housing by having the gripper or clamp grip the terminal-connected wire.

As described above, the terminal preferably is inserted directly into the connector housing by the gripper or clamp gripping the terminal connected wire. Accordingly, a control for the gripper or clamp can be simplified, thereby making it possible to reduce an installation cost for the terminal inserting operation.

Preferably, the inventive method further comprises the step of moving each held terminal. This step may comprise moving at least one retainer that holds at least one terminal. The movement may be parallel displacements to selectively provide each held terminal at a gripping position.

The parallel displacements preferably are performed in one plane extending substantially normal to the extension of the held terminals. Thus, a large number of different terminal connected wires can be stored, and can be supplied selectively to the gripping position, thereby enhancing the production effectiveness and the versatility of the method as a whole.

The method may further comprise the step of selectively supplying at least one connector housing to be provided with the terminals of terminal connected wires. In particular, the connector housings may be supplied from a column or the like where they are placed one over another. Different supply positions may be provided for different connector housings. Alternatively, different connector housings can be supplied by means of a chute or other appropriate supply means. An orienting means preferably is provided such that the supplied connector housings are so oriented as to permit the insertion of the terminal connected wires. Thus, selected connector housings can be provided with selected terminals or terminal connected wires. It is also possible to provide several connector housings in such a way that different terminals or terminal connected wires can be inserted into the different connector housings.

Preferably, the method further comprises the step of moving the gripping means in three-dimensional space, while permitting rotation and translation relative to all axes such that the gripping, transferring and inserting steps can more easily be performed.

Finally, the method may further comprise the step of controlling: the receiving of the held terminals; the insertion of the received terminals; the moving of the retainers; the holding of said terminals; the supply of at least selected connector housings; the actuation and/or movement of the gripping means according to stored, input and/or detected data on the intended wire assembly and/or on the connector housings to be provided with said terminals. By the controlling step, the inventive method is able to perform a self-adjustment with respect to the location of the terminals when being gripped and the location of the openings in the connector housings in which the terminals are to be fitted. Accordingly, when the method is to be performed for different kinds of wire assemblies, only the controlling step needs to be changed. For the purpose of inputting, storing or detecting the different data, common methods may be used, for instance, using memory means, keyboards, optical or mechanical detectors.

The apparatus for inserting a terminal of a terminal connected wire into a connector housing, comprises a wire supply unit including one or more retainers capable of holding at least one terminal connected wire while the terminal thereof is partly exposed such that it can be gripped. The apparatus also includes a housing supply unit for supplying the connector housing with which the terminal connected wire supplied from the wire supply unit is to be provided. An inserting unit also is provided for inserting the terminal of the terminal connected wire into the supplied connector housing. The retainer comprises a positioning surface for positioning the terminal connected wires so that the terminal connected wires are transferable to the inserting unit while the rotation of the terminal is prevented.

According to the above inventive apparatus, the positioning surface of the retainer uniformly positions the terminal of the terminal connected wire so that the terminal connected wire is transferable to the inserting unit. Thus, the terminal of the terminal connected wire held by the retainer is transferred while being gripped by the inserting unit, while the rotation of the terminal is prevented.

By uniformly positioning terminals of the terminal connected wires by the positioning surface of the retainer, the terminal connected wires can be transferred directly to the inserting unit. Accordingly, terminals can be inserted directly into the connector housings by the gripping means or clamps gripping the terminal connected wires. Therefore, the effects obtained by the inventive method can be obtained with the subject apparatus.

Preferably the wire supply unit comprises a stocking unit for stocking a plurality of retainers such that the retainers can be moved through parallel displacements. The wire supply unit may further comprise a conveying mechanism for moving the retainers stocked in the stocking unit through parallel displacements, and control means for controlling the conveying mechanism such that the retainers selected from the plurality of retainers faces the inserting unit.

According to the above preferred apparatus, by stocking a plurality of retainers for retaining the terminal connected wires, a multitude of terminal connected wires can be stocked. The stocked terminal connected wires may be of the same kind or of different kinds depending upon wire assemblies to be produced. Further, the conveying mechanism conveys one or more of the retainers to be selected in accordance with a control by the control means.

Further, a plurality of retainers holding the terminal connected wires can be moved through parallel displacements. Accordingly, a multitude of retainers can be stocked in a relatively small space. This leads to an advantage that the conveying mechanism can be constructed inexpensively.

Preferably, the inserting unit comprises actuatable, adjustable and/or movable gripping means, that may be arbitrarily movable in a three-dimensional space. Thus, the inserting means may be moved first to the held terminals, then actuated to grip them, and then may move to an inserting position without interfering with other components of the apparatus. Afterwards, the terminals can be inserted into one or more connector housings and finally, after the insertion, the gripping means can be caused to release the terminals. Of course, instead of using the actuatable gripping means, the inserting unit may also press-fit or use other means.

Preferably, the inventive apparatus further comprises storing, inputting and/or detecting means for storing, inputting and/or detecting data concerning the location and/or kind of the terminals and/or the connector housings. Accordingly, the inventive apparatus can be adapted easily for different kinds of wire assemblies or harnesses, using different kinds of terminal connected wires and a combination of different kinds of connector housings. Thus, the versatility of the apparatus can be enhanced considerably.

For further automation, the apparatus may further comprise control means for controlling the wire supply unit, the housing supply unit, the inserting unit and/or the gripping means. The control may be based on the stored data, input data and/or detected data or may be based on preselected criteria on the terminals, terminal connected wires, connector housings and/or wire assemblies which are to be formed. In particular, the control means is suited to obtaining and/or processing the respective data and to controlling the different units of the apparatus accordingly.

The housing supply unit preferably is formed such that a plurality of connector housings can be stocked, wherein the lowermost connector housings are respectively gripped by the clamps or gripping means. This provides accurate orientation and positioning of the connector housings which are actually to be provided with the terminals of the terminal connected wires.

Hereafter, one preferred embodiment of the invention is described in detail with reference to the accompanying drawings.

DETAILED DESCRIPTION OF THE PREFERRED EMBODIMENT

Figure 1:
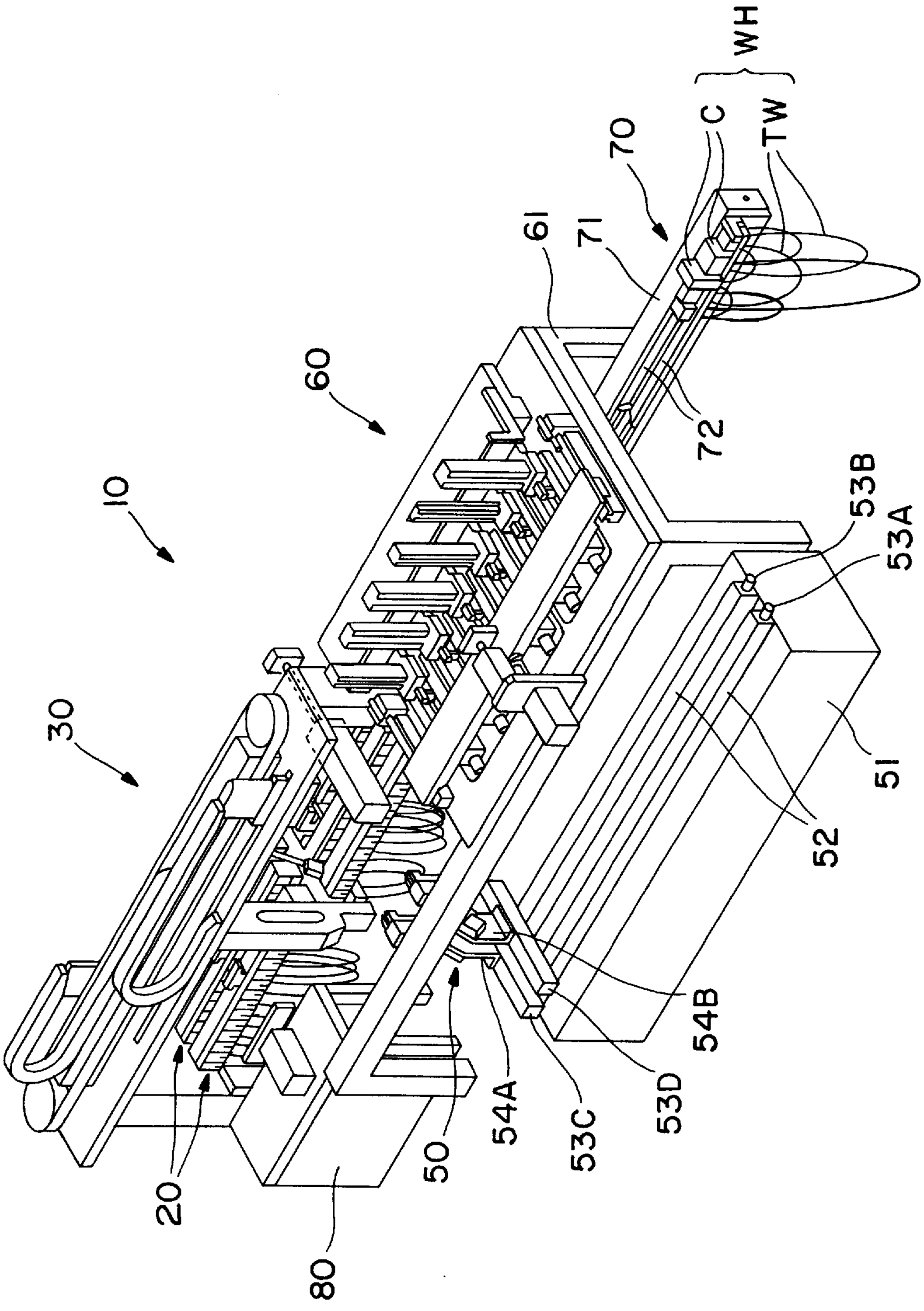
FIG. 1 is a perspective view showing the external configuration of a terminal connected wire inserting apparatus as one embodiment of the invention.

With reference to FIG. 1 a terminal connected wire inserting apparatus 10 is separated from an unillustrated line for performing a producing process that produces a terminal connected wire TW. The inserting apparatus 10 includes a wire supply unit 30, an inserting unit 50, a housing supply unit 60, an unloading unit 70 and a control unit 80. The wire supply unit 30 includes retainers 20 for retaining manually loaded terminal connected wires TW such that terminal portions T of the terminal connected wires TW are partially exposed and can be gripped. The inserting unit 50 receives the terminal connected wire TW from the retainer 20 of the wire supply unit 30, for directly inserting the terminal connected wire TW into a connector housing C. The housing supply unit 60 supplies the connector housings C into which the terminal connected wires TW are to be inserted. The unloading unit 70 unloads the connector housing C after the insertion. The control unit 80 entirely controls the inserting apparatus.

Figure 2:
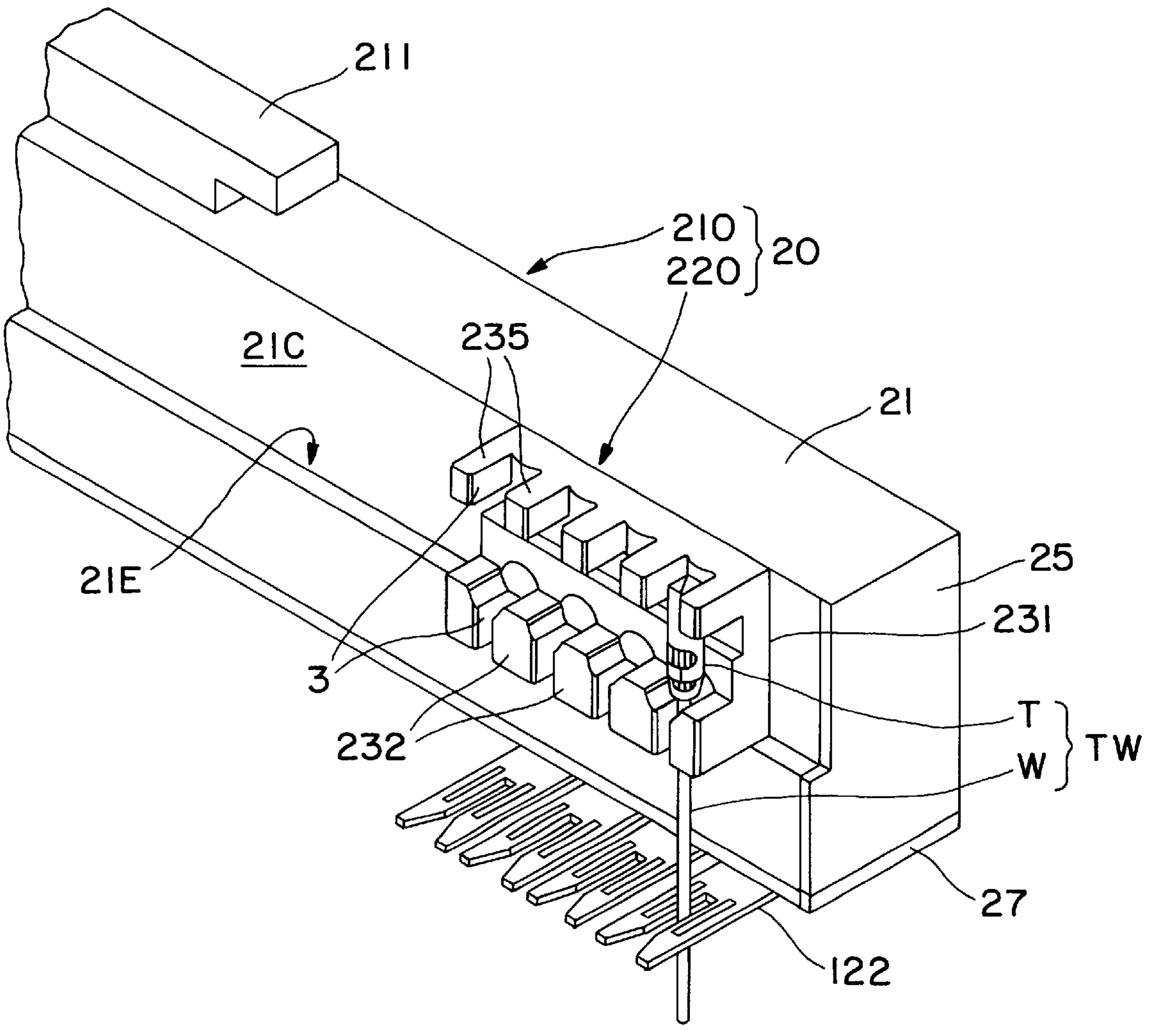
FIG. 2 is a perspective view of an essential portion of a retainer.

FIG. 2 is a perspective view showing an essential portion of the retainer 20. As shown in FIG. 2, each retainer 20 adopted or provided in the wire supply unit 30 includes a mount frame 210 and a plurality of blocks 220 detachably arranged side by side on the mount frame 210. The terminal connected wire TW is of known type in which the terminal portions T are mounted at the peeled ends of an insulated or coated wire portion.

Figure 3:
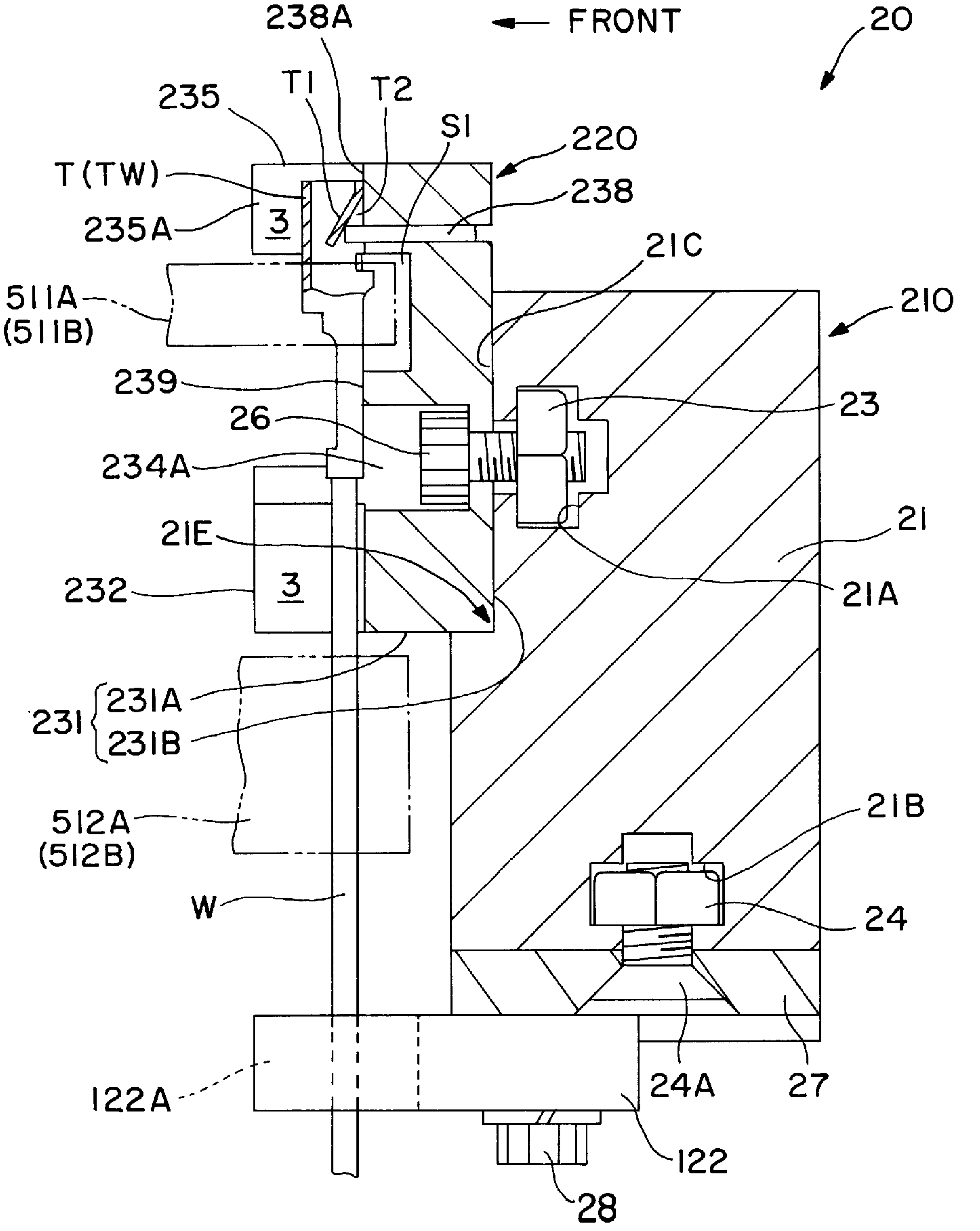
FIG. 3 is a section of the retainer.

With reference to FIG. 3, the mount frame 210 includes a main body 21 substantially in the form of a rectangular parallelepiped, a mount member 27 secured to the bottom surface of the main body 21, and guide members 122 fixed to the main body 21 via the mount member 27.

The main body 21 may be made of aluminum alloy and is formed with a first groove 21A for accommodating nuts 23 for fastening the blocks 220 such that the nuts 23 cannot be rotated and a second groove 21B for accommodating nuts 24 for fastening the mount member 27 such that the nuts 24 cannot be rotated. The grooves 21A, 21B extend along the length of the main body 21 and are open in the opposite ends of the main body 21. The opposite ends of the main body 21 are normally openably closed by cover members 25 (see FIG. 2). The first groove 21A accommodates the nuts 23 such that the center axes of the nuts 23 are substantially perpendicular to a surface 21C which is referred to hereinafter as the front surface 21C. The nuts 23 abut against the blocks 220 so as to secure the blocks 220. The second groove 21B accommodates the nuts 24 such that the center axes of the nuts 24 are substantially perpendicular to the bottom surface of the main body 21. A stepped portion 21E for aligning the blocks 220 is formed in the front surface 21C of the main body 21. The blocks 220 are arranged along the length of the main body 21 while being seated on the stepped portion 21E, and are detachably secured by bolts 26 having a hexagonal head on which nuts 23 are screwed. In the illustrated example, a grip 211 (FIG. 2) to be gripped by a conveying mechanism 32 of the wire supply unit 30 to be described later is integrally or unitarily formed substantially in the middle of the upper surface of the main body 21.

The blocks 220 are metal members of e.g. aluminum alloy. only one block 220 is shown in FIG. 2. However a plurality of blocks 220 typically will be arranged side by side on the stepped portion 21E of the mount frame 210 so as to retain the terminal connected wires TW in alignment.

With reference to FIG. 3, each block 220 has seating surfaces 231 to be seated on the stepped portion 21E formed in the main body 21 of the mount frame 210. The seating surfaces 231 include a bottom surface 231A to be placed on the bottom surface of the stepped portion 21E and a rear surface 231B abutting against the front surface 21C of the main body 21. A plurality of recesses 3 (e.g. four recesses) having a U-shaped cross section when viewed from above are formed in each block 220. The respective terminal portions T of a plurality of terminal connected wires TW are so accommodated in the recesses 3 as to face upwardly. The recesses 3 are formed by first projections 232 projecting at the bottom side of each block 220 and second projections 235 projecting at the upper side thereof. Between the corresponding projections 232 and 235 is defined an open space S1 for exposing the terminal portion T so that it can be gripped by terminal gripping means or clamps 511A, 511B of the inserting unit 50 for gripping the terminal connected wire TW.

Stepped holes 234A are formed above the first projections 232. The threaded rods of the bolts 26 are inserted through the stepped portions 234A until the head thereof come into contact with the stepped portion of the holes 234A, and are threadedly engaged with the nuts 23 accommodated in the main body 21 of the mount frame 210. In this way, the blocks 220 are detachably fixed to the mount frame 210.

The second projections 235 are spaced by a distance sufficiently long to detach the terminal connected wires TW along forward and backward directions. Inner surfaces 235A of the projections 235 enable the terminal connected wires TW to be accommodated in the recesses 3 in an unrotatable manner or in a uniform position. A pin 238 projects forwardly from the bottom of the recess 3 and functions as a positioning means with respect to the vertical direction. By inserting the pin 238 into a lance hole or engaging hole T2 that is opened when a lance or engaging member T1 of the terminal portion T is formed, the terminal connected wire TW is accurately positioned with respect to the vertical direction. Further, a surface 238A where the pin 238 is provided also acts to position the terminal portion T with respect to the forward and backward directions.

Between the first and second projections 232 and 235, there is a positioning projection 239 which projects forwardly so as to be flush with the surface 238A. The positioning projection 239 acts to position the rear surfaces of the terminal portions T of the terminal connected wires TW.

Figure 4:
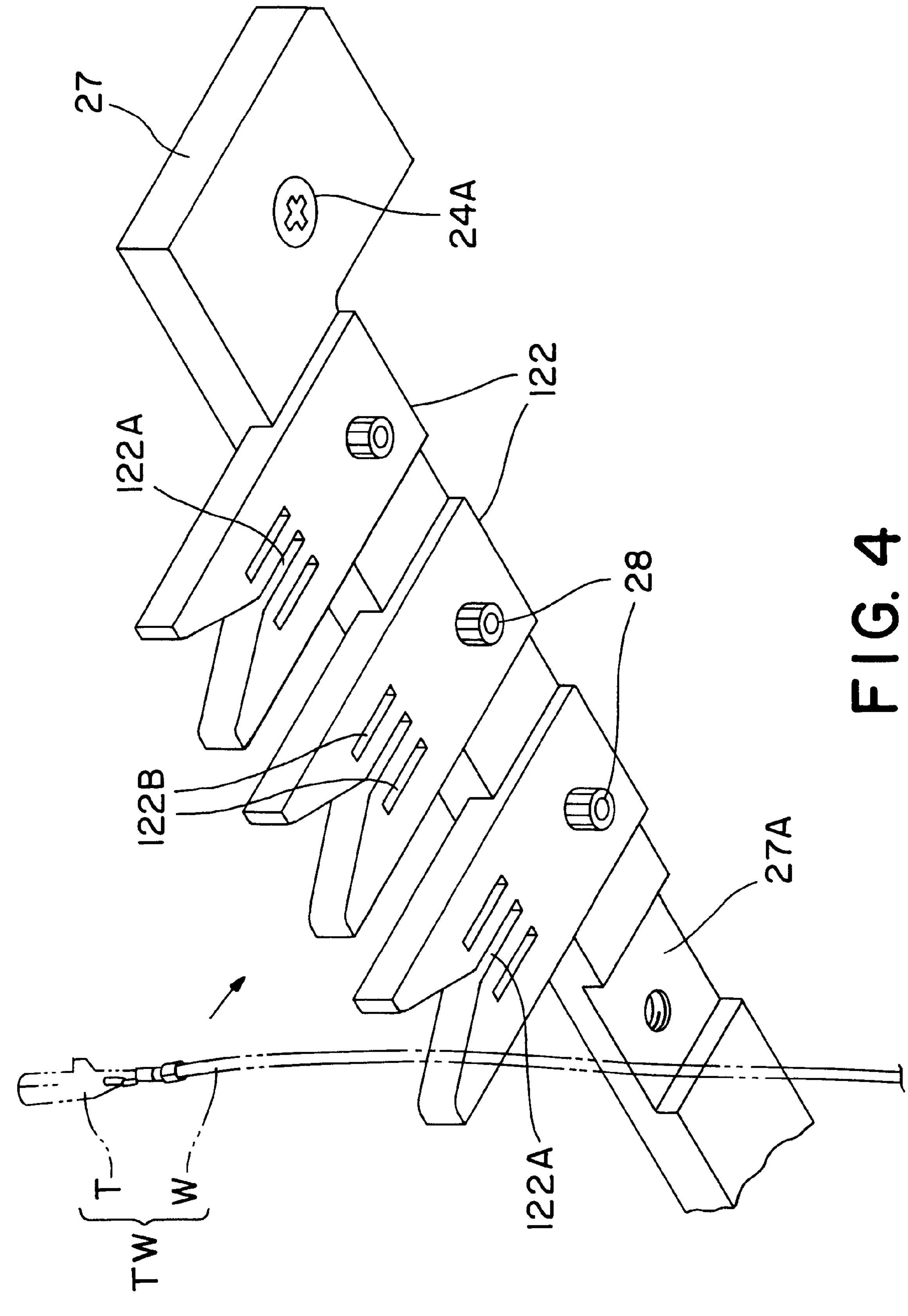
FIG. 4 is a perspective view showing the bottom surface of the retainer shown in FIG. 2.

FIG. 4 is a perspective view showing the bottom surface of the retainer 20 shown in FIG. 2. As shown in FIG. 4, the guide members 122 for the respective terminal connected wire TW are pieces made of resin. The guide members 122 are fitted into a positioning groove 27A formed in the bottom surface of the main body 21 of the mount frame 210 via the mount member 27, and are detachably mountable by the bolts 28. In the illustrated example, each guide member 122 includes a groove 122A into which the wire portion W of the terminal connected wire TW is pressed, and a pair of holes 122B for permitting a portion of the guide member 122 where the groove 122A is formed to undergo an elastic deformation. Each groove 122A is widened at its leading side so as to facilitate the insertion of the wire portion W. The terminal connected wire TW is positioned by pressing the wire portion W into the groove 122A to retain it such that a tension acts between the wire portion W and the terminal portion T.

Figure 5:
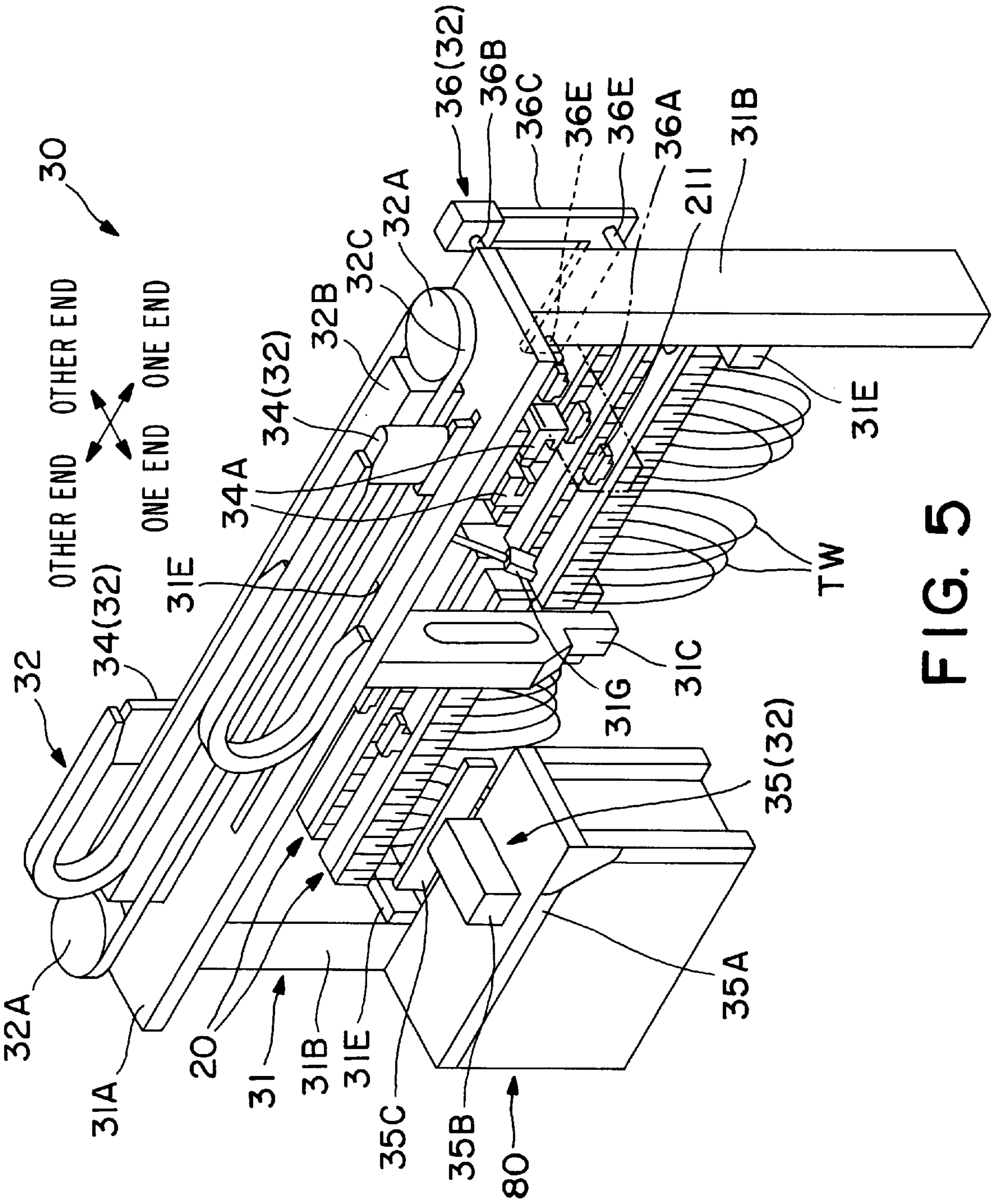
FIG. 5 is a perspective view showing the schematic construction of a wire supply unit adopted in the inserting apparatus of FIG. 1.
Figure 6:
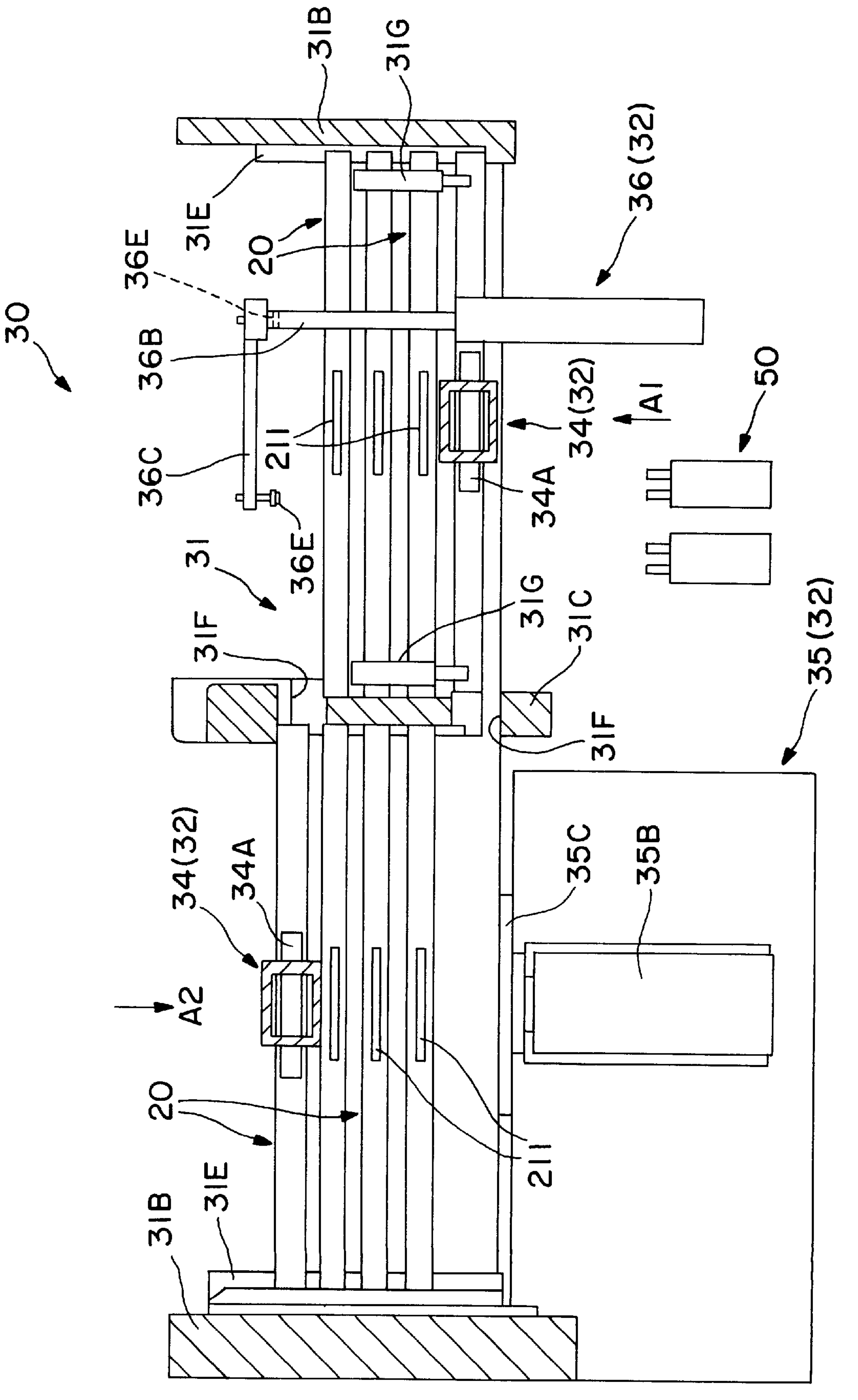
FIG. 6 is a schematic plan view partly in section of the wire supply unit adopted in the inserting apparatus of FIG. 1.

As shown in FIGS. 5 and 6, the wire supply unit 30 includes a stock rack 31 for stocking the aforementioned retainers 20 and the conveying mechanism 32 for conveying the retainers 20 stocked in the stock rack 31.

The stock rack 31 includes a ceiling plate 31A which is substantially rectangular shaped when viewed from above. A pair of columns 31B support the opposite ends of the ceiling plate 31A with respect to its longitudinal direction. A support member 31C hangs from an intermediate portion of the ceiling plate 31A. A rail member 31E is supported on the columns 31B and extends along the widthwise direction of the ceiling plate 31A. A plurality of retainers 20 are placed on the rail member 31E such that they are movable parallel to each other as described later. In an illustrated specific example, the retainers 20 are arranged in two lines in a plane. One line and the other line are obliquely opposite to each other. A leading portion of the one line is opposed to the inserting unit 50 so as to transfer the terminal connected wire TW as indicated by arrow Al, whereas a leading portion of the other line is arranged such that the retainer 20 can be mounted on and detached from the stock rack 31 as indicated by arrow A2. Further as shown in FIG. 6, a slit 31F is formed in a specified portion of the rail member 31E lest the wire portions W of the terminal connected wires TW retained by the retainers 20 should be interfered by the stock rack 31 while the retainers 20 are caused to make a parallel movement as described later. At the column 31B and the support member 31C of the stock rack 31, actuators 31G are mounted to hold the retainer 20 facing the inserting unit 50 to transfer the terminal connected wires TW.

The conveying mechanism 32 includes a pair of pulleys 32A arranged at the opposite ends of the upper surface of the ceiling plate 31A of the stock rack 31 with respect to its longitudinal direction. An endless belt 32C is fitted to the pulleys 32A. A pair of first conveyance units 34 are mounted on the endless belt 32C in specified positions. The first conveyance units 34 are so arranged as to be displaceable in opposite directions along the length of the ceiling plate 31A. Further, in a plane, the first conveyance units 34 are arranged at one and the other ends with respect to the widthwise direction of the ceiling plate 31A. Accordingly, by being connected via the endless belt 32C, one conveyance unit 34 conveys the retainer 20 located at one longitudinal end and at one widthwise end toward the other longitudinal end, whereas the other conveyance unit 34 conveys the retainer 20 located at the other longitudinal end and at the other widthwise end toward the one longitudinal end. The first conveyance units 34 are moved by an actuator 32B arranged on the ceiling plate 31A. Each first conveyance unit 34 includes parallel clamps 34A arranged below the ceiling plate 31A so as to be insertable through the slit 31F formed in the ceiling plate 31A. Each pair of parallel clamps 34A are made movable upwardly and downwardly by an unillustrated air cylinder, and are capable of gripping the grip 211 provided at the main body 21 of each retainer 20.

The conveying mechanism 32 also includes second and third conveyance units 35, 36 which are arranged at the opposite ends of the ceiling plate 31A with respect to its longitudinal direction to convey the retainers 20 along the widthwise direction of the ceiling plate 31A. The second conveyance unit 35 located at one end with respect to the widthwise direction of the ceiling plate 31A is specifically constructed by a table 35A arranged at the other end with respect to the longitudinal direction of the ceiling plate 31A and an air cylinder 35B placed on the table 35A. The retainers 20 can be conveyed along the widthwise direction by pushing the retainer 20 stocked in one line of the stock rack 31 from one widthwise end toward the other widthwise end of the ceiling plate 31A by a pushing plate 35C mounted on the air cylinder 35B. The third conveyance unit 36 includes an air cylinder 36A secured to the lower surface of the ceiling plate 31A, a substantially U-shaped pressurizing member 36C secured to a rod 36B of the air cylinder 36A, and a pressing rod 36E arranged in a specified position of the pressurizing member 36C. By expanding the rod 36B of the air cylinder 36A, the retainer 20 stocked in the other line of the stock rack 31 is pressed from the other widthwise end toward the one widthwise end of the ceiling plate 31A. In this way, the retainers 20 are conveyed along the widthwise direction by the third conveyance unit 36. It should be noted that the conveying mechanism 32 is controlled by the control unit 80 to be describe later in the illustrated specific example.

With reference to FIG. 1, the inserting unit 50 includes a base 51 and a pair of beams 52 placed on the base 51. The beams 52 horizontally extend parallel to each other along the length of the stock rack 31. Motors 53A, 53B are separately mounted on the beams 52. The motors 53A, 53B are adapted to drive ball screw mechanisms 554A, 554B (see FIG. 7) built in the beams 52. The respective ball screw mechanisms 554A, 554B are coupled with parallel members 53C, 53D extending parallel to each other along a direction normal to the length of the beams 52. The parallel members 53C, 53D are independently reciprocatingly moved along the length of the beams 52 by driving the corresponding ball screw mechanism 554A, 554B by the motors 53A, 53B.

Figure 7:
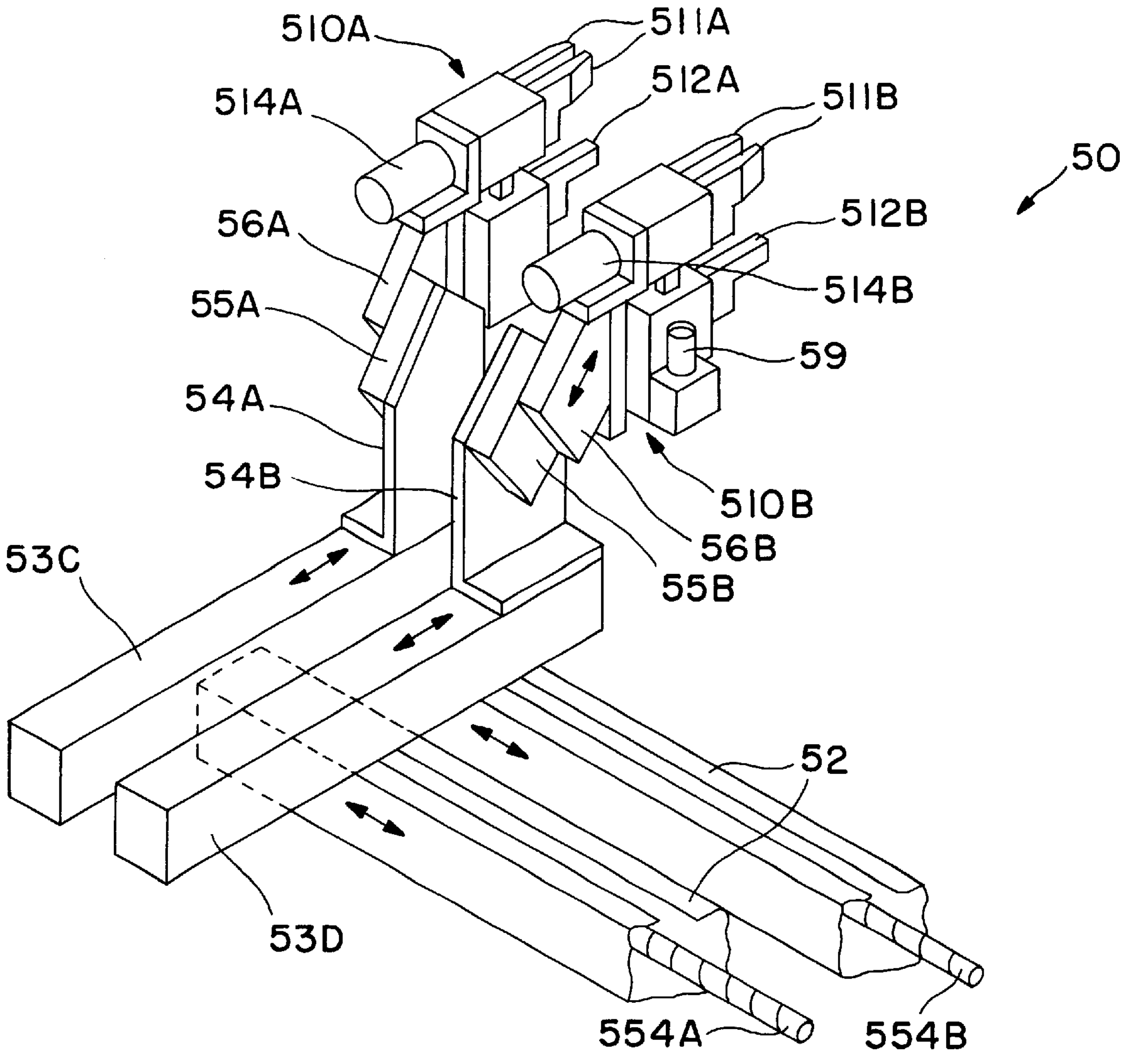
FIG. 7 is a perspective view of an essential portion of an inserting unit in the embodiment of FIG. 1.

With reference to FIG. 7, slidable arms 54A, 54B stand on the respective parallel members 53C, 53D. Parallel actuators 55A, 55B are so mounted on the slidable arms 54A, 54B as to obliquely extend toward the wire supply unit 30. Insertion gripping means or clamps 510A, 510B are carried by sliders 56A, 56B of the parallel actuators 55A, 55B.

The insertion clamps 510A, 510B have terminal chucks 511A, 511B and wire chucks 512A, 512B, respectively. The terminal chucks 511A, 511B are adapted to enclose the terminals portions T of the terminal connected wire TW held by the retainer 20 of the wire supply unit 30 (see FIG. 3). In the illustrated example, the terminal chucks 511A, 511B are opened and closed by the actuators 514A, 514B.

The wire chucks 512A, 512B are adapted to grip the wire portions W of the terminal connected wire TW held by the retainer 20 of the wire supply unit 30 and to insert the terminal portions T of the terminal connected wire TW into the connector housing C in cooperation with the terminal chucks 511A, 511B holding the terminal portions T. Though unillustrated, the wire chucks 512A, 512B have a comb-like shape similar to a known terminal inserting apparatus.

In the illustrated example, the wire chucks 512A, 512B are so arranged right below the terminal chucks 511A, 511B as to be opposed to them along the vertical direction. With this arrangement, the terminal portions T of the terminal connected wire TW are inserted from below into the connector housing C supplied by the housing supply unit 60 to be described below.

In FIG. 7, identified by 59 is an image pickup for providing the coordinates of cavities of the connector housing C supplied by the housing supply unit 60 into which the terminal portions T are to be inserted. The insertion clamps 510A, 510B are positioned based on the thus obtained coordinates.

Figure 8:
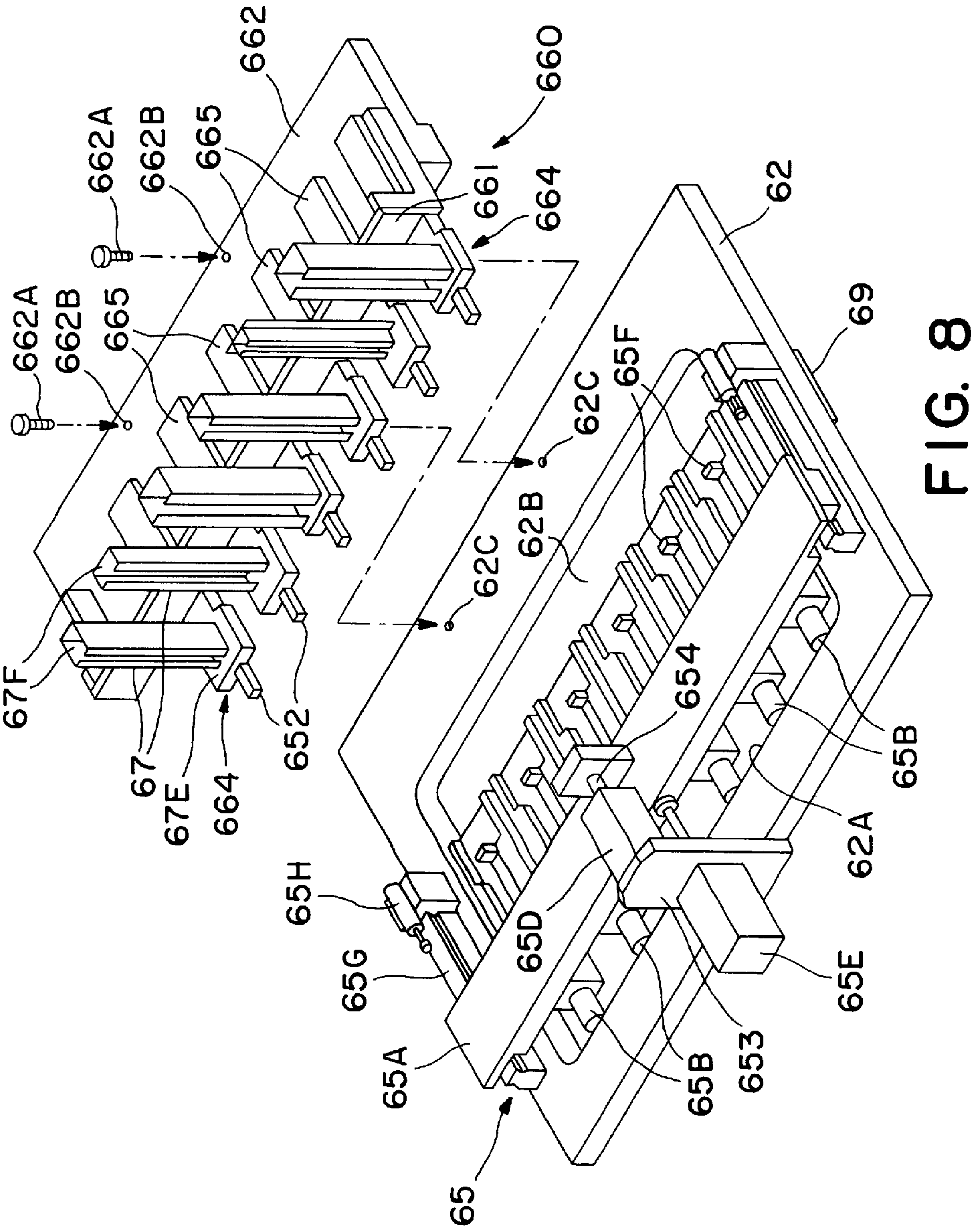
FIG. 8 is an exploded perspective view of an essential portion of a housing supply unit of FIG. 1.

With reference to FIGS. 1 and 8, the housing supply unit 60 includes a substantially rectangular first table 62 supported by a frame 61, and an exchangeable unit 660 connectable with the first table 62.

Figure 9:
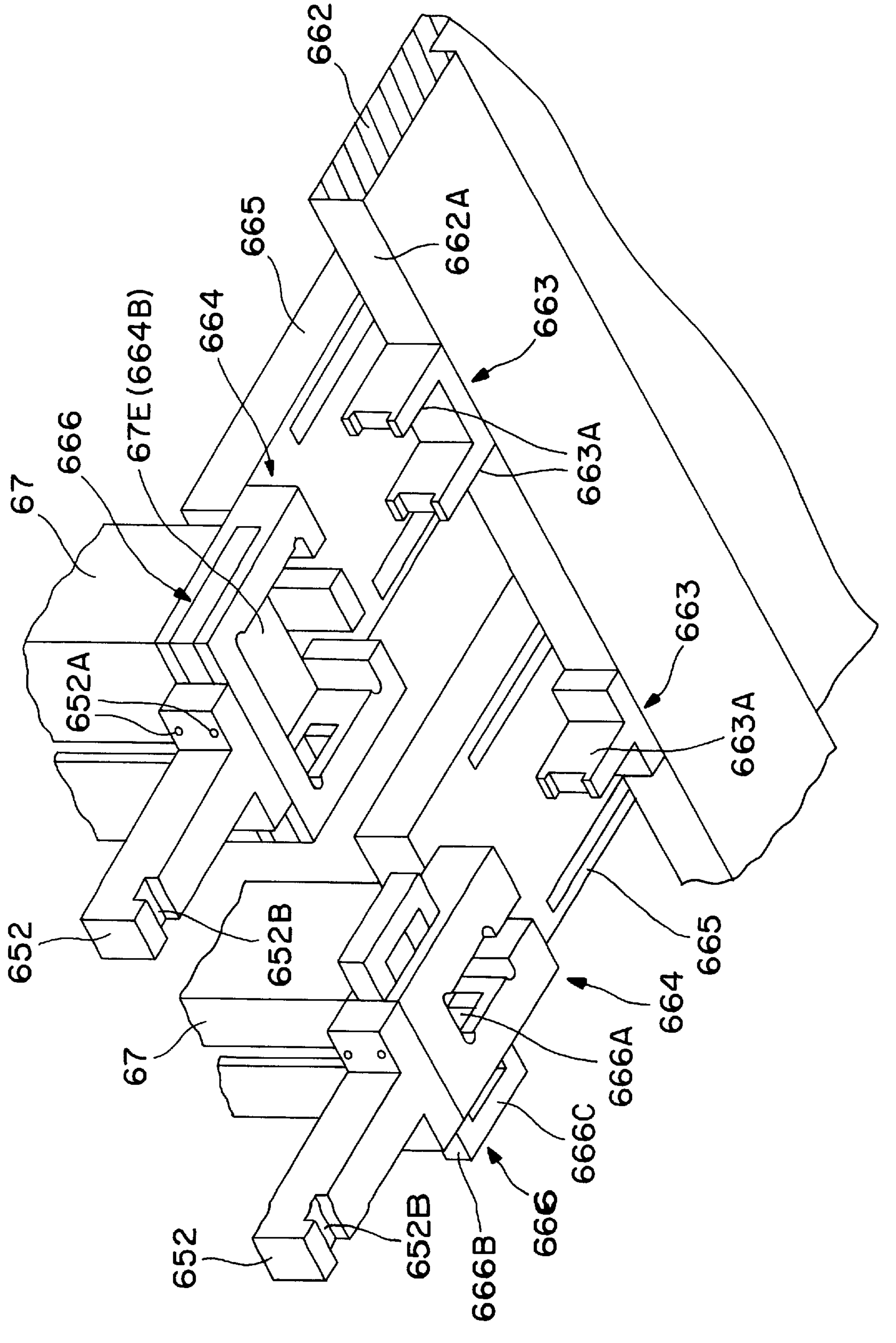
FIG. 9 is a perspective view enlargedly showing a part of the housing supply unit of FIG. 1.
Figure 10:
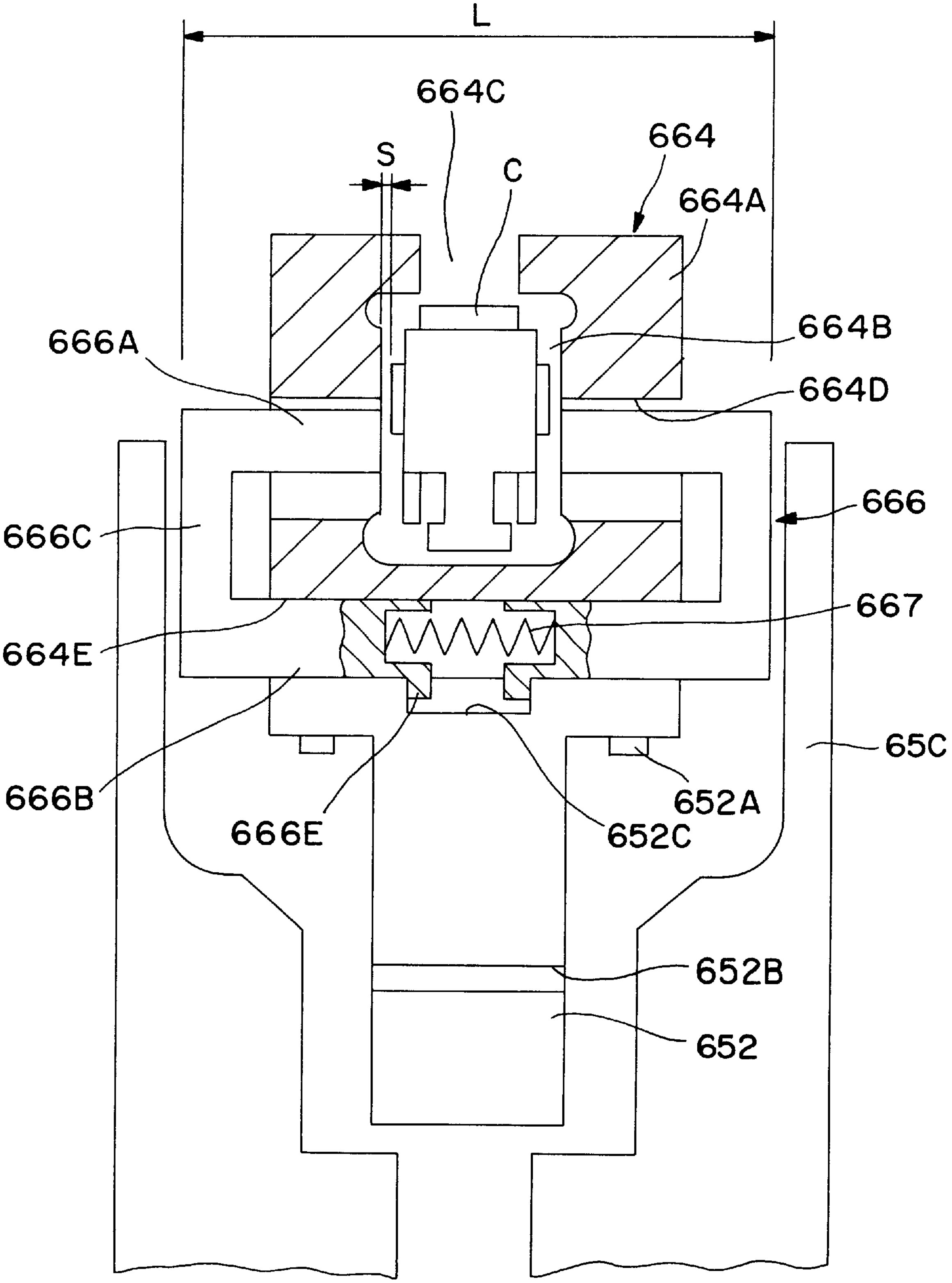
FIG. 10 is a plan view showing a portion of the housing supply unit of FIG. 1.

With reference to FIGS. 8 to 10, the first table 62 includes an actuator 65 to be accommodated in a recess 62A formed in the middle of the first table 62.

The actuator unit 65 includes a mount member 65A, a plurality of actuators 65B spaced apart along the length of the mount member 65A, a drive piston 65D for driving the mount member 65A and a restricting piston 65E for restricting a drive amount of the drive piston 65D.

The mount member 65A extends along the length of the recess 62A; is made reciprocatingly movable along the widthwise direction of the first table 62 by guide members 65G; and has its movement elastically restricted by elastic stoppers 65H.

The respective actuators 65B are adapted to move parallel gripping means or clamps 65C toward and away from each other and are identically specified.

The pistons 65D and 65E both are mounted in specified positions on the first table 62 via a mount member 653.

A rod 654 of the drive piston 65D is secured to a middle portion of the mount member 65A. The drive piston 65D displaces the parallel clamps 65C of the respective actuators 65B to a receiving position, a supply position and an unload position to be described below by reciprocatingly moving the actuators 65B along the widthwise direction of the first table 62 via the mount member 65A.

The restricting piston 65E is arranged right below the drive piston 65D for defining a stroke from the supply position to the unload position and a stroke from the unload position to the receiving position as described later.

The lower surface of the first table 62 is closed by a receiving plate 69 secured by screws, and the connector housings C supplied through upper openings 67F of cassettes 67 are placed on the receiving plate 69. A position where the receiving plate 69 is provided corresponds with the aforementioned receiving position. In this receiving position, the clamps 65C of the actuators 65B can grip the connector housings C placed on the receiving plate 69.

Between the receiving plate 69 and a positioning unit 663 is defined an unload port 69A (see FIG. 11) through which the connector housings C connected with the terminal connected wires TW, i.e. the wire bundle assembly WH (see FIG. 1) as a product can be unloaded.

Next, the exchangeable unit 660 is detachably mounted on the first table 62 by inserting bolts 662A into insertion holes 662B of a base 662 and screwing them into threaded holes 662C formed in the first table 62. The cassettes 67 are integrally mounted on the base 662 via the mount members 661.

The cassettes 67 are tubular angle or upright members having different sizes in conformity with the shapes of the connector housings C to be connected. Each cassette 67 is formed with a lower opening 67E for allowing the supply of the connector housings from below and the upper opening 67F for allowing the accommodation of the connector housings C from above. Inside the cassette 67, a plurality of connector housings C are stacked one over another. The cavities of the connector housings C are oriented downward. A plurality of kinds of exchangeable units 660 are prepared so as to conform to different kinds of subassemblies to be produced. FIG. 8 shows one example of the exchangeable unit 660. The positioning member 663 is provided with one or two positioning projections 663A in conformity with the shape of the connector housings C (see FIG. 11) to be positioned.

The base 662 also is provided with one transfer member 664 for each pair of the cassette 67 and the positioning member 663. The transfer member 664 is relatively displaceably connected with the base 662 so that it can transfer to the positioning member 663 the connector housing C supplied through the lower opening 67E of the corresponding cassette 67 and placed on the receiving plate 69.

With reference to FIGS. 9 and 10, the transfer member 664 includes a substantially rectangular main body 664A. In a center portion of the main body 664A, there is formed a receptacle 664B for accommodating the connector housing C supplied from the cassette 67.

The main body 664A is formed with an insertion groove 664C opening toward the positioning member 663 so as to correspond to the positioning projection 663A. The insertion groove 664C is adapted to insert the positioning projection 663A into the receptacle 664B so that the positioning projection 663A acts in cooperation with the inner walls of the receptacle 664B to accurately position the connector housing C in a terminal insertion position.

With reference to FIG. 9, a shutter 652 is mounted by bolts 652A on an end surface of the main body 664A opposite from the positioning member 663A. In this specific example, the shutter 652 is in the form of a block and formed in its bottom surface with a groove 652B. By connecting the groove 652B with a connection member 65F provided below the parallel clamps 65C, the shutter 652 is integrally displaceable with the clamps 65C.

With reference to FIG. 10, the main body 664A is provided with a pair of U-shaped slidable elements 666 so spaced that the opposite ends of one slidable element 666 are opposed to those of the other slidable element 666. In order to mount the respective slidable elements 666 on the main body 664A, the main body 664A is formed with an insertion hole 664D which extends along a direction normal to the extension of the insertion groove 664C, is open in side portions of the main body 664A, and communicates with the receptacle 664C, and a guide groove 664E formed in an end face of the main body 664A opposite from the positioning member 663. Each slidable element 666 is formed by three integral or unitary members: a pressing portion 666A which is to be inserted into the insertion groove 664D to press the connector housing C located inside the main body 664A; a guide portion 666B which is to be guided into the guide groove 664E; and a receiving portion 666C for connecting the pressing portion 666A and the guide portion 666B at right angles and transmitting a received gripping force of the clamps 65C to the pressing portion 666A and the guide portion 666B.

The guide portion 666B of each slidable element 666 is integrally or unitarily formed with an engaging projection 666E. The engaging projections 666E engage in a recess 652C formed in the shutter 652 to prevent the slidable elements 666 from coming out of the main body 664A and to define a displacement stroke. A compression coil spring 667 is provided between the guide portions 666B of the respective slidable elements 666 in its compressed state. Normally, the pressing portions 666A of the respective slidable elements 666 are retracted from the receptacle 664B by a biasing force of the compression coil spring 667. By gripping the receiving portions 666C of the slidable elements 666 by the clamps 65C in this state, the pressing portions 666A enter the receptacle 664B to grip the connector housing C inside the main body 664A. In the illustrated specified example, a grip stroke S for pushing the pressing portion 666A into the receptacle 664B to grip the connector housing C and a maximum length L defined by the slidable elements 666 to be gripped are set at the same values in any exchangeable unit 660 regardless of the size of the main body 664A. Thus, the connector housings C having different specifications can commonly be gripped by the same clamps 65C.

Next, with reference to FIG. 1, the unloading unit 70 is adapted to unload the connector housings C after the terminal inserting operation from below the housing supply unit 60. As shown in FIG. 1, the unloading unit 70 includes a beam 71 which is supported on the support column of the housing supply unit 60 so as to horizontally extend along the length of the base 1. A ball screw mechanism (not shown) is built in the beam 71, and conveyance claws 72 are connected therewith. The conveyance claws 72 are displaceable between an unload position away from the first table 62 of the housing supply unit 60 and a load position right below the unload port 69A of the first table 62. Accordingly, the connector housings C after the terminal inserting operation are received in the load position and conveyed to the unload position, and consequently a product after the connection can be unloaded.

The control unit 80 is constructed by a microcomputer or other electronical device, and controls the aforementioned respective units in accordance with a sequence to be described later.

Next, the operation of the aforementioned embodiment is described.

First, with reference to FIG. 1, the control unit 80 drives the conveying mechanism 32 of the wire supply unit 30 for the parallel displacements of the retainers 20 in FIG. 1. The retainer 20 carrying the terminal connected wires TW to be supplied is temporarily stopped in a position facing the inserting unit 50.

The respective gripping means or clamps 511A, 512A, 511B, 512B of the inserting unit 50 grip the terminal portions T of the corresponding terminal connected wires TW in the respective blocks 220 of the selected retainer 20. At this time, since the respective terminal portions T are uniformly positioned by the recesses 3 of the blocks 220, the terminal connected wires TW can be transferred to the respective clamps 511A, 512A, 511B, 512B of the inserting unit 50 without being displaced, and in particular without being rotated. In this way, the terminal connected wires TW are transferred to the insertion clamps 510A, 510B of the insertion unit 50 from the wire supply unit 30. After receiving the terminal connected wire TW from a corresponding retainer 20, the insertion clamps 510A, 510B proceed to their inserting positions.

Figure 11:
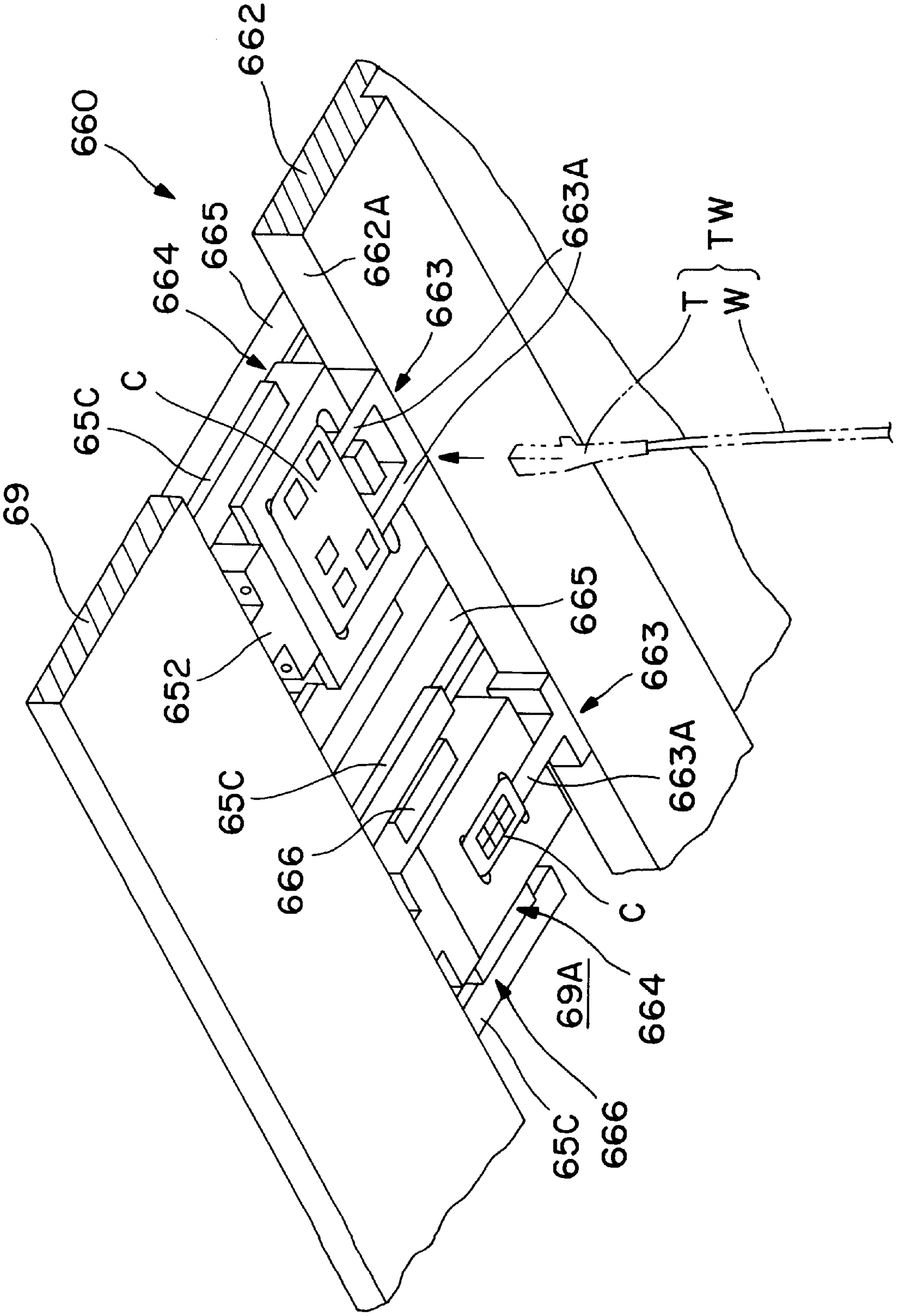
FIG. 11 is a perspective view showing a terminal inserting operation performed in the housing supply unit of FIG. 1.

With reference to FIG. 11, simultaneously with the transfer of the terminal connected wire TW, the housing supply unit 60 positions the connector housings C. In this positioning operation, the parallel clamps 65C grip the connector housings C placed on the receiving plate 69 via the slidable elements 666 of the transfer members 664 in a position as indicated in FIG. 11. When the parallel clamps 65C grip the connector housings C, the rod of the drive piston 65D is expanded, thereby displacing the parallel clamps 65C to the supply position as indicated in FIG. 11 to position the connector housings C in cooperation with the positioning members 663. During this process, since the shutters 652 driven together with the parallel clamps 65C close the lower openings 67E of the cassettes 67 immediately after the connector housings C gripped by the parallel clamps 65C are conveyed toward the positioning unit 66, the succeeding connector housings C are kept in the cassettes 67. When the parallel clamps 65C reach their proper supply positions, the end faces of the shutters 652 press the connector housings C against the positioning surfaces of the positioning members 663.

With the connector housings C positioned, the terminal inserting operation is performed by inserting the insertion means or clamps 510A, 510B of the inserting unit 50 into the cavities of the connector housings C in which the terminal connected wires TW are positioned. During this time, the restricting piston 65E projects its rod by a specified distance so as to define a position where the mount member 65A stops in a subsequent process. Accordingly, the respective clamps 65C are accurately displaced to the unload position and wait on standby there.

Further, by opening the parallel clamps 65C after they are displaced to their receiving positions, the wire bundle assembly WH is transferred to the conveyance claws 72. By displacing the conveyance claws 72 to the unload position, the wire bundle assembly WH as a product can be unloaded. The parallel clamps 65C after the transfer of the product are returned to their receiving positions while being kept open. Thus, the shutters 652 open the lower openings 67F of the cassettes 67, with the result that connector housings C can newly be supplied from the cassettes 67. The parallel clamps grip the new connector housings C.

By repeating the aforementioned operations, the terminal inserting operation can continuously be performed.

As described above, in the aforementioned embodiment, the clamps 511A, 512A gripping the terminal connected wire TW directly insert the terminal portions T into the connector housings C. Accordingly, the control of the clamps 511A, 512A is simplified, thereby making it possible to reduce an installation cost for the terminal inserting operation.

Further, by uniformly positioning the terminal portions T of the terminal connected wires TW by the inner surfaces 235A (see FIG. 3) of the retainer 20, the terminal connected wires TW can directly be transferred to the inserting unit 50. Accordingly, the clamps 511A, 512A gripping the terminal connected wire TW directly insert the terminal portions T into the connector housings C, with the result that the installation cost can further be reduced.

Furthermore, since a plurality of blocks 220 retaining the terminal connected wires TW can be moved around through parallel displacements, a multitude of blocks 220 can be stocked in a relatively small space. This leads to an advantage that the conveying mechanism can be constructed inexpensively.

The foregoing embodiment is nothing but a preferred specific example of the invention, and the invention is not limited thereto. It should be appreciated that a variety of design changes can be made within the scope of the present invention as claimed.

What is claimed is:

1. A method for producing wire assemblies, each said wire assembly comprising at least one terminal connected to at least one wire to define at least one terminal-connected wire, said wire assembly further comprising at least one connector housing into which said at least one terminal is inserted, said method comprising the steps of:

providing supplies of terminal-connected wires and supplies of connector housings, said connector housings being supplied such that terminal insertion openings thereof face downwardly and such that terminal insertion directions thereof are parallel;

holding the terminals of the terminal-connected wires in a wire supply unit such that the wires hang substantially parallel to one another below the terminals and with the terminals partly exposed such that rotation of the terminals is prevented;

gripping the exposed portion of at least one said held terminal with a gripper; and moving the gripper for separating the terminal-connected wires from the wire supply unit and inserting the gripped terminal upwardly into the connector housing while keeping the wire hanging below the terminal for preventing the wires from becoming entangled with one another while producing the wire assembly.

2. A method according to claim 1, wherein the step of holding the terminal comprises holding the terminal with a retainer, and wherein the method further comprises the step of moving the retainer through parallel displacements to selectively provide the held terminal at a gripping position.

3. A method according to claim 1, wherein the step of moving the gripper comprises moving the gripper for rotation and translation through three-dimensional space.

4. A method according to claim 3, further comprising the step of controlling the gripping of the held terminal, the insertion of the gripped terminal, the moving of said retainer holding the terminal, the supply of at least one selected connector housing, the actuation and the movement of the gripper means according to stored, input and detected data on the intended wire assembly and the connector housing to be provided with said terminal.

5. An apparatus for inserting each of a plurality of terminals of terminal-connected wires into connector housings, each said terminal-connected wire comprising a wiring extending from the terminal thereof, said apparatus comprising:

a wire supply unit including at least one stocking unit, a plurality of retainers disposed in said stocking unit, each said retainer being capable of holding the terminal and portions of the wire adjacent the terminal for one said terminal-connected wire such that the wires of the terminal-connected wires held by the retainers in said stocking unit hang substantially parallel to one another and below the respective terminals, said wire supply unit further comprising a conveying mechanism for moving at least one said stocking unit with the wires hanging and in parallel relationship to one another;

a housing supply unit in proximity to the wire supply unit for supplying connector housings into which the terminals supplied from the wire supply unit are to be inserted, each said connector housing having an insertion opening for receiving at least one said terminal in an insertion direction, said housing supply unit being disposed to position said insertion openings of the connector housings facing downwardly and with the insertion directions substantially parallel to one another;

an inserting unit in proximity to both the wire supply unit and the housing supply unit for sequentially gripping both the terminal and a portion of the wire of each said terminal-connected wire held by the retainers of the wire supply unit, said inserting unit moving the terminal-connected wire from the respective retainer with the wire hanging downwardly therefrom to a position beneath a selected connector housing supplied by the housing supply unit and inserting the gripped terminal upwardly and into the supplied connector housing;

an unloading unit in proximity to the housing supply unit for removing the connector housings after the terminals have been inserted therein, said unloading unit gripping the connector housings while keeping the wires hanging therefrom; and wherein the retainer comprises a positioning surface for positioning the terminal-connected wire so that the terminal-connected wire is transferable to the inserting unit, while rotation of the terminal is prevented.

6. An inserting apparatus according to claim 5, wherein the inserting unit comprises movable gripper movable for rotation and translation through three-dimensional space.

7. An inserting apparatus according to any of claim 6, further comprising means for at least one of storing, inputting and detecting data with respect to the terminal and the connector housing.

8. An inserting apparatus according to claim 6, further comprising a control means for controlling at least one of the wire supply unit, the housing supply unit, the inserting unit and the gripper based on preselected criteria on the terminal, terminal-connected wire, connector housing, and wire assembly which is to be formed.

* * * * *